United States Patent [19]

Jonnston

[11] Patent Number: 4,487,445
[45] Date of Patent: Dec. 11, 1984

[54] CRAWLER TRACTOR SEAT PIVOTABLE TO RIGHT OF CENTER

[75] Inventor: Kenneth W. Jonnston, Chatham, Ill.

[73] Assignee: Fiatallis North America, Inc., Carol Strean, Ill.

[21] Appl. No.: 472,594

[22] Filed: Mar. 7, 1983

[51] Int. Cl.³ .......................... B60N 1/02; A47C 1/00
[52] U.S. Cl. .................................. 296/65 R; 296/67; 297/349; 180/326; 180/330
[58] Field of Search ...................... 296/67, 65 R, 71; 297/349; 180/326, 329, 330; 172/435

[56] References Cited

U.S. PATENT DOCUMENTS

| | | | |
|---|---|---|---|
| 1,942,070 | 1/1934 | Smelker | 296/65 R |
| 2,822,858 | 2/1958 | Mussler | 297/349 X |
| 2,845,990 | 8/1958 | Hobert | 297/349 X |
| 3,039,553 | 6/1962 | van der Lely et al. | 180/329 |
| 4,417,715 | 11/1983 | Edwards | 297/349 X |

Primary Examiner—David A. Scherbel
Assistant Examiner—Russell D. Stormer
Attorney, Agent, or Firm—August E. Roehrig, Jr.

[57] ABSTRACT

A vehicle seat having an independent armrest positioned adjacent thereto. The vehicle seat and armrest are both pivotally mounted at a forward end and are independently pivotable from a first position wherein the vehicle seat is forwardly facing, and the armrest is positioned parallel to the vehicle center line, to an angled position wherein the vehicle seat is pivoted into a fixed predetermined angular relationship with the vehicle center line and the armrest is positioned parallel thereto. Suitable locking mechanisms are provided to position the armrest and vehicle seat in their respective predetermined positions.

6 Claims, 4 Drawing Figures

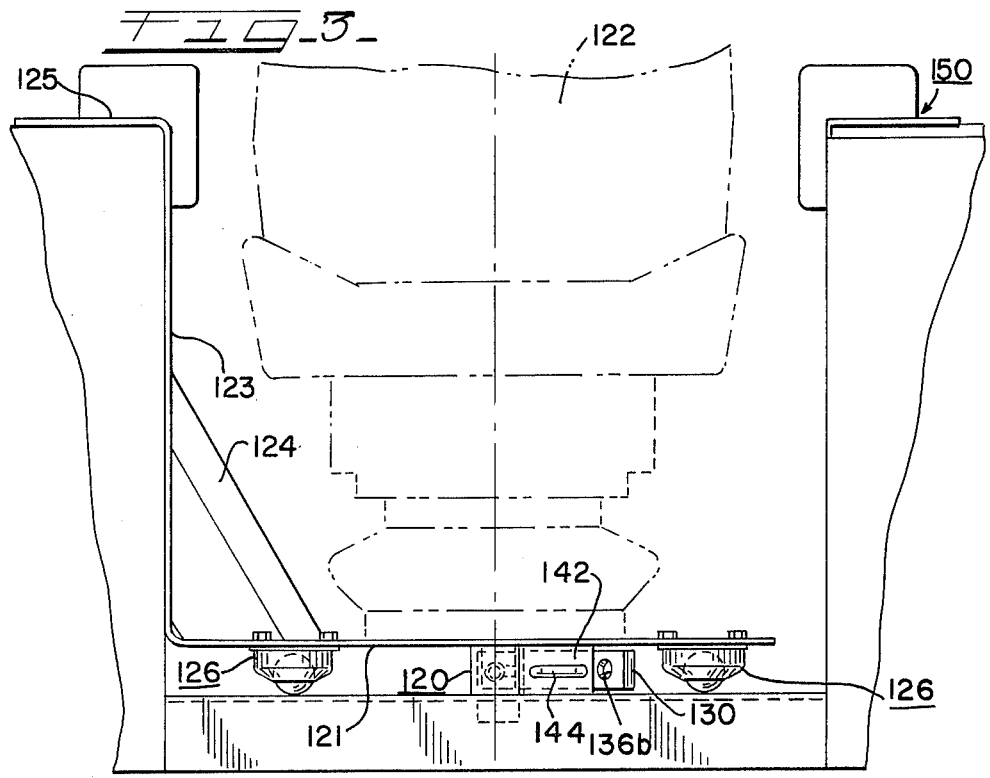
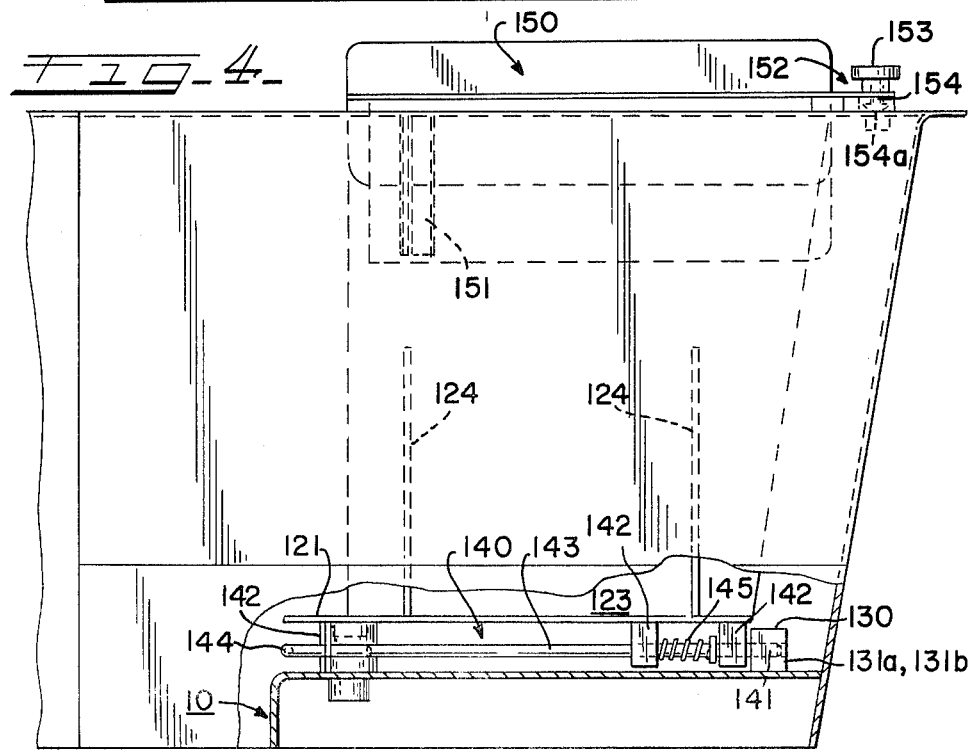

CRAWLER TRACTOR SEAT PIVOTABLE TO RIGHT OF CENTER

BACKGROUND OF THE INVENTION

This invention relates in general to vehicle seat assemblies and, in particular, to a vehicle seat assembly adapted to be pivoted into defined positions for enabling the vehicle to be more conveniently operated.

More specifically, but without restriction to the particular use which is shown and described, this invention relates to an adjustable seat mechanism for a vehicle wherein the vehicle seat, and an arm rest for the seat, are separately pivotable between two positions which enable the vehicle operator to conveniently operate the vehicle while controlling and monitoring equipment mounted on either the front or rear of the vehicle, or both.

In the operation of construction and industrial machinery such as crawler tractors, it is highly advantageous to provide the greatest ease for the vehicle operator to operate the equipment while observing and controlling the operation of auxiliary equipment positioned on the front and rear of the vehicle. However, in vehicles such as crawler tractors, the operating seat is fixed to face in a forward direction, and various controls for auxiliary equipment associated with the vehicle are mounted in arm rests positioned on either side of the vehicle within reach of the machine operator. Such positioning of the seat, and the auxiliary controls, is quite satisfactory when the operator is using and controlling auxiliary equipment carried at the front of the vehicle, such as a dozer blade. However, such seat structures are inconvenient when the operator must observe and control auxiliary equipment which is carried at the rear of the vehicle, such as a ground engaging ripper, while the tractor is in operation. When a ripper is being utilized on a crawler tractor, the apparatus for raising, lowering, and operating the ripper assembly is secured to the rear of the vehicle. As the crawler tractor pulls the ripper assembly through the earth, the operator must control the depth at which the ripper teeth are extended while the crawler tractor moves forwardly.

Heretofore when the machine operator was using a ripper assembly, the stationary seat required the operator to twist his body in the seat in order to observe rearwardly for controlling and monitoring the ripper operation. Such pivoting of the operator's body within the fixed seat is both tiring and fatiguing, as well as being uncomfortable for even short periods of time. Therefore, it would be quite desirable to enable the operator's seat to be pivoted into a position such that the vehicle operator can observe the ripping operation while the crawler tractor is moving forwardly. The machine operator, therefore, must not only be positioned to observe the ripping operation, but must at all times be able to observe the forward movement of the crawler tractor to insure a proper ripping operation and to prevent an accident.

While certain construction and industrial machinery has been equipped with a pivotable seat assembly, such as disclosed in U.S. Pat. No. 3,542,424, "Movable Seat Assembly", such seat assemblies are generally used for equipment such as a back hoe, wherein the vehicle is stationary when the auxiliary or accessory equipment carried at the rear end of the vehicle is being operated by the machine operator. Therefore, such seat assemblies have not been designed to provide for the positioning of the vehicle seat to insure simultaneous forward observation, while operating the rearwardly operating equipment, or to insure the operator's convenient accessibility to various controls for steering or controlling the vehicle's forward progress while using the auxiliary equipment at the rear portion of the vehicle.

The present invention provides a pivotal seat construction wherein the seat assembly is pivotable between a forwardly facing direction and an angulated position such that the machine operator may conveniently observe both forwardly and rearwardly of the vehicle. An independently pivotable armrest is positioned adjacent to the vehicle seat assembly, and is positionable parallel to the vehicle seat such that the controls by which the operation of the vehicle is effected are within ready and convenient access to the machine operator at all times in both positions of the vehicle seat.

SUMMARY OF THE INVENTION

It is, therefore, an object of this invention to improve vehicle seating.

Another object of this invention is to mount a vehicle seat for pivotal movement between a forwardly facing position and a predetermined angled position relative to the vehicle center line for operating the vehicle while monitoring rearwardly mounted auxiliary equipment operable by the forward movement of the vehicle.

A further object of this invention is to maintain the vehicle controls conveniently accessible to the vehicle operator.

A still further object of this invention is to improve operator comfort and convenience in operation of construction vehicles.

Yet another object of this invention is to improve operator observation in both a forwardly and rearwardly direction when operating rear mounted accessory equipment.

These and other objects are obtained in accordance with the present invention wherein there is provided a vehicle seat having an independent armrest positioned adjacent thereto. The vehicle seat and armrest are both pivotally mounted at a forward end and are independently pivotable from a first position wherein the vehicle seat is forwardly facing, and the armrest is positioned parallel to the vehicle center line, to an angled position wherein the vehicle seat is pivoted into a fixed predetermined angular relationship with the vehicle center line and the armrest is positioned parallel thereto. Suitable locking mechanisms are provided to position the armrest and vehicle seat in their respective predetermined positions.

DESCRIPTION OF THE DRAWINGS

Further otjects of the invention together with additional features contributing thereto and advantages accruing therefrom will be apparent from the following description of a preferred embodiment of the invention which is shown in several drawings with like reference numerals indicating corresponding parts throughout, wherein:

FIG. 3 is a frontal elevation of a vehicle seat assembly constructed in accordance with the invention with portions thereof removed to better illustrate components thereof; and FIG. 4 is side profile view of a vehicle seat assembly constructed in accordance with the invention with portions broken away to better illustrate the mechanism for pivotally moving the seat assembly and an attendant armrest.

DESCRIPTION OF THE PREFERRED EMBODIMENT

Figure 1:
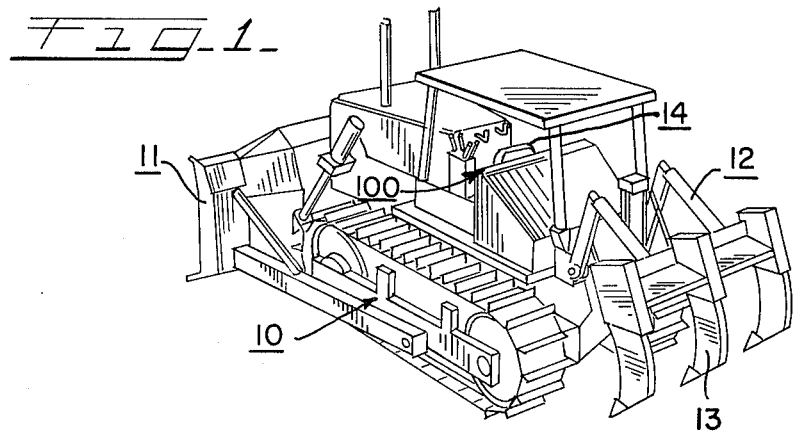
FIG. 1 is a perspective view of a crawler tractor having auxiliary equipment carried at the front and rear of the tractor in the form of a dozer blade and ripper assembly, respectively, which are operated and controlled by the vehicle operator.

Referring now to FIG. 1, there is shown a crawler tractor 10 having a dozer blade assembly 11 supported at the forward end thereof, and a ripper assembly 12 carried at the rear of the crawler tractor. To perform a ripping operation, ripper teeth 13 are lowered into contact with the ground over which the crawler tractor is passing, and as the crawler tractor moves forwardly a downward force is applied on the ripper assembly, 12. This downward force, in combination with the curvature of the ripper construction, causes the ripper teeth 13 to penetrate into the ground for performing the earth ripping operation as the crawler tractor 10 moves forward.

Within an operator's compartment 14 are suitable controls for operating the crawler tractor 10 and controlling the ripper assembly 12 in order to perform the earth ripping operation. As previously discussed, during ripping operation it is necessary for the crawler tractor operator to maintain a forward vigilance insuring safe operation while observing and monitoring the ripping operation. To this end the machine operator must be capable of continually watching the vehicle's forward progress, while observing rearwardly to insure that the ripping operation is being performed in a satisfactory manner.

Figure 2:
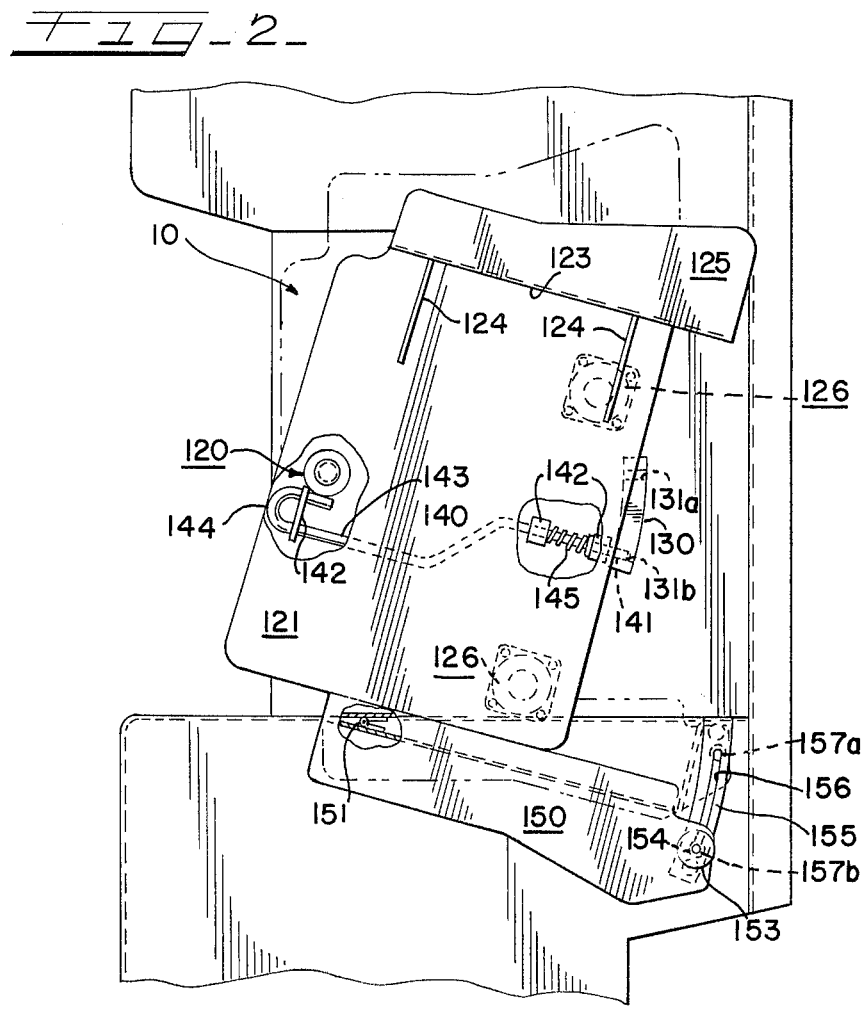
FIG. 2 is an enlarged planar view, with portions broken away, of a seat assembly constructed in accordance with the invention and adapted to be used in a crawler tractor as illustrated in FIG. 1.

In the center of the operator's compartment 14 there is provided a seat assembly 100 which is shown mounted on the longitudinal center line of the crawler tractor. The seat assembly is secured to the crawler by a pivot connection 120 secured to a forward portion of a bottom forming seat support plate 121 upon which a vehicle operator's seat 122, shown in phantom in FIG. 3, is mounted. As shown in FIGS. 2–4, the bottom or seat support plate 121 has an upwardly extending side wall forming plate 123 extending vertically upward from one side thereof, which is braced by a pair of brace members 124 appropriately secured at one end to the bottom wall 121, and at the other end to the side wall 123, as by welding. The upper portion of the side wall 123 is bent outwardly in a horizontal plane for forming an armrest 125 which is movable with the seat support plate 121 about the pivot connection 120.

The forward portion of the bottom or seat support plate 121 is pivotally connected to the crawler tractor 10 by means of the pivot connection 120 which preferably is positioned to lie on the longitudinal center line of the crawler tractor 10. A pair of ball support roller assemblies 126 are secured to the bottom of plate 121 at the two rear corners thereof by appropriate means such as bolts or rivets for supporting the seat assembly and facilitating pivotal movement.

To the rear of the seat support plate 121 is positioned a seat locking bar 130 secured to the crawler tractor 10 and formed with two detents 131a and 131b which are adapted to receive and engage a free end 141 of a seat release bar assembly 140. Upon engagement of the free end of the seat release bar assembly with either of the detents 131a or 131b, the vehicle seat will be secured in either of the two predetermined positions. The seat release bar assembly 140 is carried beneath the seat support plate 121 by a plurality of brackets 142 in which a release bar 143 is laterally movable relative thereto for moving the free end 141 of the release bar 143 into and out from engagement with the detents 131a and 131b of the lock bar 130. The forward end of the release bar 143 is formed in a loop 144 and supported in one of the brackets 142 beneath the forward portion of the seat support plate 121 so that the vehicle operator may have convenient access to the release bar for effecting pivoting of the seat support plate 121 about the pivot connection 120. A coil spring 145 is concentrically supported about a portion of the release bar 143 and abuts at one end a stop carried by the release bar and at the other end one of the brackets 142 such that a biasing force is exerted on the release bar 143 for extending the free end 141 into one of the detents 131a or 131b.

During vehicle operation a vehicle operator may conveniently reach beneath the seat support 121 and manually grasp the loop 144, formed in the release bar 143, which is positioned adjacent the pivot connection 120. Pulling forward on the release bar will disengage the free end 141 from either of the detents 131a or 131b freeing the seat support plate 121 for pivotal movement about the pivotal connection until the free end 141 engages the other of the detents 131a or 131b. While the pivotal movement of the seat assembly 100 about the pivotal connection 120 can be varied to different degrees, it has been found that with a seat positioned on the vehicle longitudinal center line, pivotal movement of the seat 15° from the center line, as shown is preferable for providing ease of simultaneous forward observation while monitoring rearward operation.

Positioned adjacent to the seat support plate 121 is a second armrest 150 which is pivotally connected at a forward end to a portion of the crawler tractor 10 by a hinge 151 such that the rear portion of the armrest 150 may be pivoted outwardly about the hinge connection 151. The rear portion of the armrest 150 has a releasable latching or lock mechanism 152 carried thereon which includes a knob 153 having an outwardly spring-loaded plunger member 154 concentrically mounted therein with a spring (not shown) biasing the plunger 154 outwardly. A guide plate 155 is secured to a portion of the crawler tractor 10 with the shaft of the plunger 154 being positioned within a slot 156 formed in the plate such that the pivotal movement of the armrest 150 is controlled and limited by the extent and direction of the slot 156. A pair of armrest latch detents 157a and 157b are formed beneath the guide plate 155 into which the head 154a of the plunger may extend to lock the armrest 150 in either of two positions defined by the ends of the slot 156. In operation, when the knob 153 is pulled upwardly, the plunger head 154a moves upwardly out from engagement with either of the detents 157a or 157b. The amount 150 can thereby be pivotally moved into a position where at the plunger 154 will be extended into the other detent.

As best shown in FIG. 2, both the seat support plate 121 and the armrest 150 may be pivoted between a first position wherein the armrest 150 is parallel to the seat support plate 121 when in a forwardly facing position, as shown in phantom, or into a position wherein the armrest 150 is parallel to the seat support plate 121 when the seat has been pivoted into a position angulated from the forward facing position, to enable the machine operator to observe the forward movement of the crawler tractor while monitoring the ripping operation which occurs when the crawler tractor is moving forwardly.

While the invention has been described with reference to a preferred embodiment, it will be understood by those skilled in the art that various changes may be made and equivalents may be substituted for elements thereof without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle seat assembly with portions thereof pivotally movable between predetermined positions to facilitate a vehicle operator's observation and monitoring of auxiliary equipment operable behind the vehicle when the vehicle is moving forwardly, comprising
    a seat supporting platform for supporting a vehicle seat upon which a vehicle operator may be seated to operate the vehicle,
    seat means secured to said platform means for seating a vehicle operator,
    a forward portion of said seat supporting platform being pivotally connected to the vehicle for selective pivotal movement from a first forwardly observing position to a second forwardly and rearwardly observing position which is angulated from said first forwardly observing position, and
    an armrest pivotally connected to the vehicle and positioned adjacent to said seat supporting platform for selective pivotal movement relative to the vehicle and said seat supporting platform,
    said armrest being pivotable from a first position parallel to said seat supporting platform when said platform is in said first forwardly observing position to a second position angulated from said first position and parallel to said seat supporting platform when said platform is positioned in said second angulated position.

2. The seat assembly of claim 1 further including means for releasably securing said seat supporting platform in said first and said second positions.

3. The seat assembly of claim 2 further including means for releasably securing said armrest in said first and said second positions.

4. The seat assembly of claim 2 wherein said means for releasably securing said seat supporting platform in said first and said second positions comprises
    a release bar carried by and supported from said platform for movement relative thereto, and
    lock means secured to the vehicle and positioned to be selectively engaged by said release bar when said platform is in said first and said second positions for retaining said seat support platform in either of said positions.

5. The seat assembly of claim 3 wherein said means for releasably securing said armrest in said first and said second positions comprises
    a releasable latch carried at the rear portion of said armrest for pivotal movement therewith between said first and said second positions,
    a slotted guide secured to the vehicle and engaging said releasable latch to guide the movement thereof between said first and said second positions, and
    retainer means positioned at the ends of said slotted guide for receiving and retaining said releasable latch in said first and said second positions.

6. A vehicle seat assembly pivotally mounted on a vehicle for selective movement between a first position wherein the vehicle operator is forwardly facing during vehicle operation and a second position wherein during vehicle operation the vehicle operator is facing in a position angulated from the forwardly facing position in order to monitor the operation of auxiliary equipment operable behind the vehicle when the vehicle is moving in a forward direction comprising
    a vehicle seat support having a forward portion pivotally connected to the vehicle for pivotal movement of said seat support relative to the vehicle about said pivotal connection,
    said seat support being pivotable from a first position wherein said seat support is forwardly facing to a second position wherein said seat support is angulated relative thereto,
    a first armrest secured to and depending from said vehicle seat support for pivotal movement therewith,
    a selectively movable seat support release bar secured to said seat support for pivotal movement therewith and movable relative to said seat support between an engaging and a disengaging position,
    said seat support release bar having a spring coiled concentrically thereabout for applying a biasing force thereto for maintaining said release bar in said engaging position,
    seat support lock means secured to the vehicle and having two detents for engagement with said seat support release bar to thereby hold said seat support in a fixed position upon engagement of said release bar in said detents,
    said two detents of said seat support lock means mutually exclusively defining said first and said second pivotal positions of said vehicle seat support,
    a second armrest positioned adjacent said vehicle seat support and having a forward portion pivotally secured to the vehicle for pivotal movement of said second armrest relative to the vehicle and said vehicle seat support,
    said second armrest being pivotal from a first armrest position parallel to said seat support when positioned in said first seat support position, and a second armrest position parallel to said seat support when positioned in said second seat support position,
    selectively engagable armrest latch means carried at a rearward portion of said second armrest and adapted upon engagement with armrest latch detent means to secure said second armrest in said first armrest and said second armrest positions, and
    armrest latch detent means secured to the vehicle and positioned to be engaged by said selectively engagable armrest latch means for mutually exclusively securing said second armrest in said first armrest and said second armrest positions.

* * * * *